United States Patent [19]
Kapoor

[11] Patent Number: 5,751,969
[45] Date of Patent: May 12, 1998

[54] APPARATUS AND METHODS FOR PREDICTING AND MANAGING CONGESTION IN A NETWORK

[75] Inventor: Vijay Kapoor, Phoenix, Ariz.

[73] Assignee: Motorola, Inc., Schaumburg, Ill.

[21] Appl. No.: 566,626

[22] Filed: Dec. 4, 1995

[51] Int. Cl.$^6$ ............................. G06F 13/00; H04L 12/56
[52] U.S. Cl. ................. 395/200.65; 395/200.53; 370/235
[58] Field of Search ............ 395/200.02, 200.1, 395/200.11, 200.13, 200.53, 200.54, 200.55, 200.6, 200.65, 200.68; 370/230, 232, 235, 236

[56] References Cited

U.S. PATENT DOCUMENTS

| | | | |
|---|---|---|---|
| 5,276,677 | 1/1994 | Ramamurthy et al. | 370/232 |
| 5,313,454 | 5/1994 | Bustini et al. | 370/231 |
| 5,400,329 | 3/1995 | Tokura et al. | 370/232 |
| 5,426,640 | 6/1995 | Hluchyj et al. | 370/235 |
| 5,434,860 | 7/1995 | Riddle | 370/232 |
| 5,546,377 | 8/1996 | Ozveren | 370/235 |
| 5,602,829 | 2/1997 | Nie et al. | 370/235 |
| 5,617,409 | 4/1997 | Ozveren et al. | 370/235 |

*Primary Examiner*—Krisna Lim
*Assistant Examiner*—Viet Vu
*Attorney, Agent, or Firm*—Harold C. McGurk

[57] ABSTRACT

Method (100) executed by congestion controller (26) in each node (20, 30, 40) of a network (10) determines whether congestion is going to occur or is occurring in a particular node (20, 30, 40). If congestion is imminent or occurring, a congestion status bit is set. Each time a data packet is received and the congestion indicator bit is set, congestion controller (26) increments a congestion counter. Each time a predetermined time interval expires, congestion controller (26) decrements the congestion counter. By using the congestion counter as an index into a credit table, a credit value is determined by destination node (31) that represents how many data packets are permitted to be sent from source node (30) to destination node (31). The credit value is sent to the source node via a message.

14 Claims, 3 Drawing Sheets

5,751,969

APPARATUS AND METHODS FOR PREDICTING AND MANAGING CONGESTION IN A NETWORK

TECHNICAL FIELD

This invention relates generally to nodal networks and, in particular, to an apparatus and methods for predicting traffic congestion and managing network traffic in a network.

BACKGROUND OF THE INVENTION

Most conventional communication systems, especially space-based mobile telecommunication systems are designed to handle a specific traffic load under normal operation conditions. However, under adverse conditions (e.g., cross-link or satellite failures) or during unanticipated traffic loads (e.g., constant data traffic), the network may experience traffic congestion or overloading, thus resulting in data packets getting destroyed. If data packets are destroyed, voice quality may significantly deteriorate or data messages may become incomplete. Thus, there is a significant need for a way to predict when traffic congestion will occur and reduce traffic into node of the network to avoid traffic congestion and loss of data packets.

DESCRIPTION OF THE PREFERRED EMBODIMENTS

The present invention has utility in that it monitors traffic into each of the nodes of a network, predicts when congestion is going to occur in a node and manages the network traffic through the nodes to avoid traffic congestion. By detecting when congestion is likely to occur, the data packet traffic is managed so that data packets are not destroyed or lost.

A "satellite" as used throughout this description means a man-made object or vehicle intended to orbit the earth. A "satellite" comprises geostationary, low-earth and medium-earth orbiting satellites and/or combinations thereof. A "constellation" means a number of satellites arranged in orbits for providing specified coverage (e.g., radio communication, remote sensing, etc.) of a portion, portions or all of the earth. A constellation typically includes multiple rings (or planes) of satellites and may have an equal number of satellites in each plane, although this is not essential. The terms "cell", "beam" and "antenna pattern" are not intended to be limited to any particular mode of generation and include those created by either terrestrial or space-based telecommunication systems and/or combinations thereof.

Figure 1:
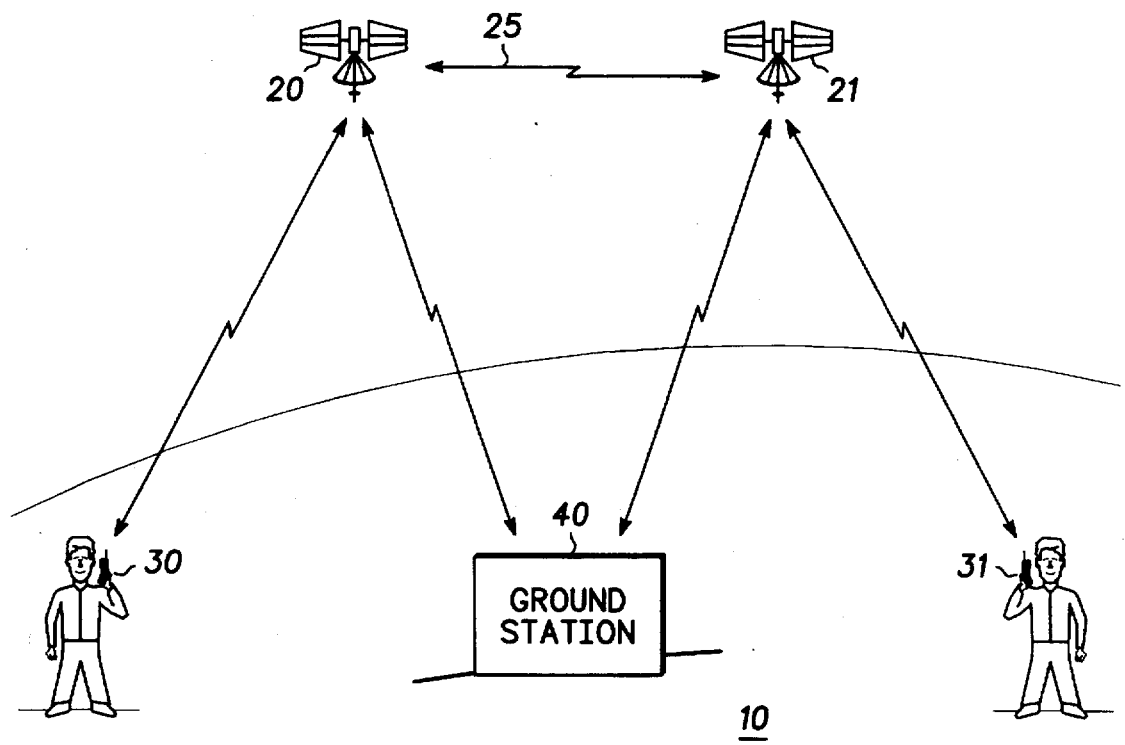
FIG. 1 shows a general view of a space-based mobile telecommunication system according to a preferred embodiment of the present invention.

FIG. 1 shows a general view of space-based telecommunication system 10 according to a preferred embodiment of the present invention. Although FIG. 1 illustrates a highly simplified diagram of mobile telecommunication system 10, system 10 comprises at least one satellite 20, any number of subscriber units 30 and at least one ground station 40. Generally, telecommunication system 10 may be viewed as a network of nodes. Nodes are represented as satellites 20, 21, subscriber units 30, 31 and ground station 40. All nodes of communication system 10 are or may be in data communication with other nodes of communication system 10 through communication links. In addition, all nodes of telecommunication system 10 are or may be in communication with other telephonic devices dispersed throughout the world through public service telephone networks (PSTNs) and/or conventional terrestrial communication devices coupled to a PSTN through conventional terrestrial ground stations.

The present invention is applicable to space-based telecommunication systems that assign particular regions on the earth to specific cells on the earth, and preferably to systems that move cells across the surface of the earth. Although the present invention is applicable to space-based telecommunication systems 10 having at least one satellite 20 in low-earth, medium-earth or geosynchronous orbit, satellite 20 is preferably in low-earth orbit around earth. Satellite 20 may be a single satellite or one of many satellites in a constellation of satellites orbiting earth. The present invention is also applicable to space-based telecommunication systems 10 having satellite 20 which orbits earth at any angle of inclination including polar, equatorial, inclined or other orbital patterns. The present invention is applicable to systems 10 where full coverage of the earth is not achieved (i.e., where there are "holes" in the telecommunication coverage provided by the constellation) and to systems 10 where plural coverage of portions of the earth occur (i.e., more than one satellite is in view of a particular point on the earth's surface).

Each satellite 20 communicates with other nearby satellites 21 through cross-links 25. These cross-links 25 form a backbone of space-based mobile telecommunication system 10. Thus, a call or communication from one subscriber unit 30 located at any point on or near the surface of the earth may be routed through a satellite 20 or a constellation of satellites 20, 21 to another subscriber unit 31 (which is receiving the call) on or near the surface of the earth from another satellite 21. How satellites 20, 21 physically communicate (e.g., spread spectrum technology) with subscriber units 30, 31 and ground station 40 is well known to those of ordinary skill in the art.

Subscriber units 30, 31 may be located anywhere on the surface of earth or in the atmosphere above earth. Mobile telecommunication system 10 may accommodate any number of subscriber units 30, 31. Subscriber units 30, 31 are preferably communication devices capable of receiving voice and/or data from satellites 20, 21 and/or ground station 40. By way of example, subscriber units 30, 31 may be hand-held, mobile satellite cellular telephones adapted to transmit to and receive transmissions from satellites 20, 21 and/or ground station 40. Moreover, subscriber units 30, 31 may be machines capable of sending email messages, video transmitters or facsimile units, just to name a few.

How subscriber units 30, 31 physically transmit voice and/or data to and receive voice and/or data from satellites 20, 21 is well known to those of ordinary skill in the art. In the preferred embodiment of the present invention, subscriber unit 30 communicates with satellite 20 using a limited portion of the electromagnetic spectrum that is divided into numerous channels. The channels are preferably combinations of L-Band, K-Band and/or S-band frequency channels but may encompass Frequency Division Multiple Access (FDMA) and/or Time Division Multiple Access (TDMA) and/or Code Division Multiple Access (CDMA) communication or any combination thereof. Other methods may be used as known to those of ordinary skill in the art.

Ground station 40 communicates with and controls satellite 20. Although ground station 40 could also control satellite 21, a different ground station 40 may control satellite 21. There may be multiple ground stations 40 located at different regions on the earth. For example, there may be one ground station 40 located in Honolulu, another located in Los Angeles and another in Washington, D.C. Another example is to have separate ground stations 40 located in each country on the earth. Ground stations 40 may provide satellite control commands to satellites 20, 21 so that satellites 20, 21 maintain their proper position in their orbit and perform other essential house-keeping tasks. Ground stations 40 may be additionally responsible for receiving voice and/or data from satellites 20, 21. How ground station 40 physically communicates (e.g., spread spectrum) with satellites 20 and/or subscriber units 30 is well known to those of ordinary skill in the art.

Figure 2:
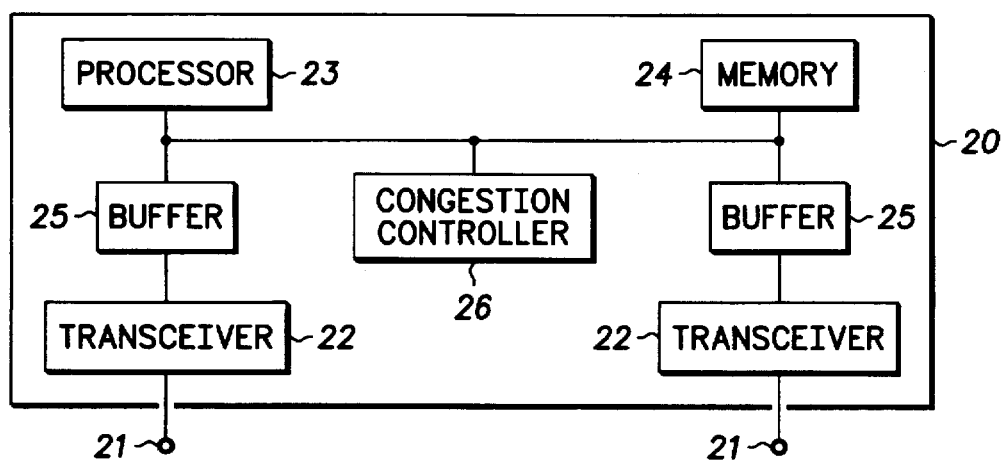
FIG. 2 shows a general view of the components of a node according to preferred embodiment of the present invention.

FIG. 2 shows a general view of the components of a node according to a preferred embodiment of the present invention. A node includes, but is not limited to, satellites 20, 21, subscriber units 30, 31 and ground station 40. For purposes of this discussion, reference will be made to satellite 20, although most of the components are similar to those in ground station 40. Satellite 20 comprises at least the following components: antennas 21, transceivers 22, processor 23, memory 24, buffers 25 and congestion controller 26. There may be other components of satellite 20 that are not shown which are necessary for operating a satellite but are not important to the present invention. These other components are well known to those of ordinary skill in the art, including for example, solar arrays and fuel propulsion system in satellites 20, or switches and network routers in ground station 40. Moreover, there may be more than one of the components in satellite 20, such as multiple processors 23, for example.

Each of antennas 21 of satellite 20 is coupled to its own transceiver 22. Each of the transceivers 22 are coupled to its own buffer 25. Buffers 25 are coupled to each other, and to processor 23, memory 24 and congestion controller 26. Transceivers 22 are able to transmit or receive data or voice, and may be for example, a modem. Each of the transceivers 22 may be assigned to receive data packets from another satellite 20, subscriber units 30 or ground station 40. For example, transceiver 22 shown on the right in FIG. 2 may be used for cross-link communication, while transceiver 22 shown on the left in FIG. 2 may be a feeder link.

Processor 23, via an executable software program, controls the operation of satellite 20 and the other components of satellite 20. Memory 24 stores executable software programs and other satellite information. Buffers 25 store in the interim data packets received by transceivers 22 or data packets from memory 24 which are to be transmitted. Congestion controller 26 comprises at least a processor and memory. Congestion controller 26 executes a variety of software programs that monitor network traffic, predict when congestion is going to occur and manage nodal and network traffic to avoid traffic congestion. Antenna 21, transceiver 22, processor 23, memory 24 and buffers 25 are all well known to those of ordinary skill in the art.

Although the preferred embodiment uses congestion controller 26, in alternative embodiments, congestion controller 26 may be replaced by processor 23 if processor 23 is capable of performing the same functions as congestion controller 26. Processor 23 could monitor, predict and manage traffic congestion similar to what is performed by congestion controller 26.

Figure 3:
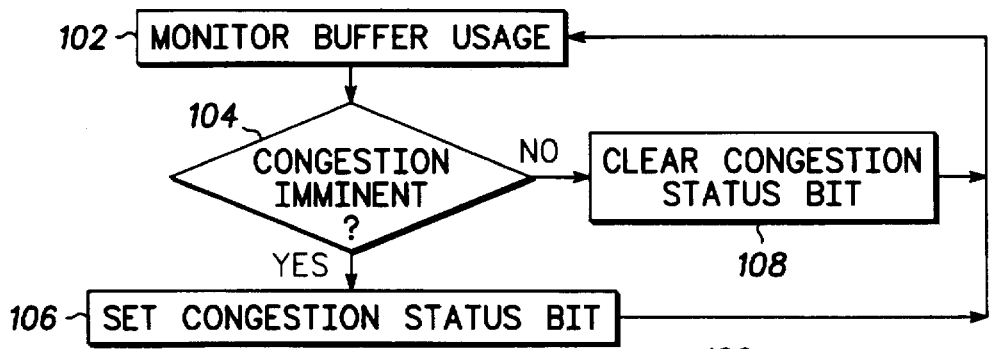
FIG. 3 shows a flowchart of a method for monitoring network traffic and predicting traffic congestion according to a preferred embodiment of the present invention.

FIG. 3 shows a flowchart of method 100 for monitoring network traffic and predicting traffic congestion according to a preferred embodiment of the present invention. Method 100 is executed by congestion controller 26 in each of the nodes (e.g., satellite 20, ground station 40, etc.) in a network. Congestion controller 26 is executing an executable software version of method 100 shown in FIG. 3. The congestion controller is executing method 100 concurrently with other programs, including method 150 (FIG. 4, infra), method 160 (FIG. 5, infra) and method 170 (FIG. 6, infra).

The congestion controller begins in step 102 by monitoring the buffers and determining how the buffers are currently being used. Usage of a buffer is determined by examining how much and how quickly data packets are being received or transmitted through the buffers at the present time. Once buffer usage information is obtained in step 102, the congestion controller determines in step 104 whether congestion is imminent or is occurring. This step is determined by using algorithms that predict, based on the current statistical trends of buffer usage, whether traffic congestion is about to happen or if traffic congestion is occurring.

An example of how congestion controller determines in step 104 whether congestion is likely to occur in a node is as follows. First, each node takes at periodic intervals a snapshot of its resources. Second, when congestion occurs, the congestion controller examines the snapshots taken over a period of time, say five seconds, for example. Third, from the snapshots taken over the period of time, a profile of resource depletion is determined. Finally, when the profile is repeated at a future time, congestion of traffic passing into and through the particular node is predicted to occur. In other words, the congestion controller predicts that congestion is imminent based on a comparison of the previous resource depletion profile and the current profile of resource depletion.

If the congestion controller determines that congestion is imminent or is occurring in step 104, the congestion controller sets in step 106 a congestion status bit which indicates that congestion is imminent. The congestion status bit is stored in either the congestion controller, memory or some other part of a node. When the congestion status bit is set in a particular node, the congestion controller sets a congestion indicator bit in each data packet that is passing through the particular node.

If congestion is not imminent or is not occurring as determined by the congestion controller in step 104, the congestion status bit is cleared in step 108. When the congestion status bit is not set in a particular node, the congestion controller does not set the congestion indicator bit in each data packet that is passing through the particular node. However, if a data packet received at a node has its congestion indicator bit already set by a previous node, and the congestion status bit at the node is not set, the congestion indicator bit is not cleared. The congestion indicator bit, if previously set, will continue to be set until it arrives at the destination node.

For example, suppose subscriber unit 30 was communicating with subscriber unit 31 through satellites 20 and 21 (i.e., intermediary nodes). Further suppose that satellite 20 predicted that congestion was imminent and set its congestion status bit, while satellite 21 predicted that congestion was not imminent and did not set its congestion status bit. Thus, whenever satellite 20 receives data packets from subscriber unit 30 it sets the congestion indicator bit before the data packets are transmitted to satellite 21. Satellite 21 does not clear the congestion indicator bit included in the data packets, but transmits the data packets with the congestion indicator bit set to subscriber unit 31. In other words, the congestion bit is not cleared by satellite 21 even though the congestion status bit of satellite 21 is cleared.

Once the congestion controller finishes executing steps 106 and 108, method 100 returns to step 102 to continuously monitor buffer usage and determine whether traffic congestion is imminent in step 104. Method 100 continues indefinitely.

Figure 4:
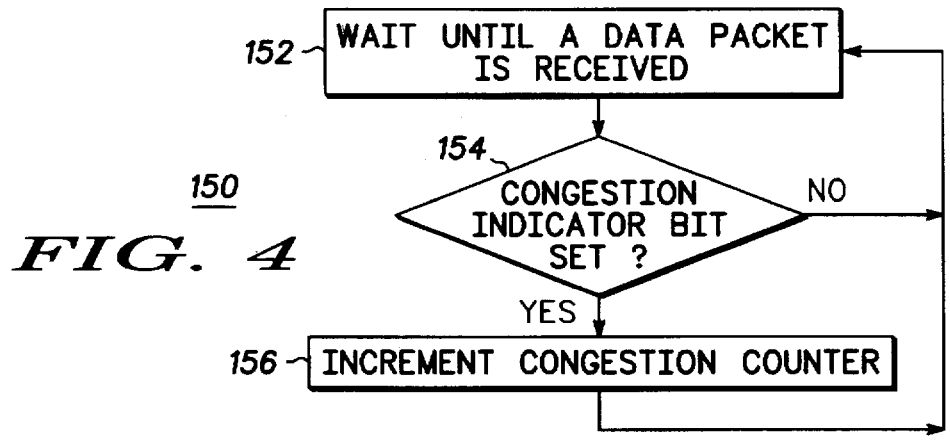
FIG. 4 shows a flowchart of a method for receiving a data packet and incrementing a congestion counter according to a preferred embodiment of the present invention.

FIG. 4 shows a flowchart of method 150 for receiving a data packet and incrementing a congestion counter according to a preferred embodiment of the present invention. Method 150 is performed by the congestion controller (26 in FIG. 2) in each of the nodes in a network concurrently with the execution of method 100 (FIG. 3, supra), method 160 (FIG. 5, infra) and method 170 (FIG. 6, infra). Method 150 is executed by the congestion controller any time a data packet is received at the node. The congestion controller begins in step 152 by waiting until a data packet is received. A data packet is received at an antenna, which is sent to a transceiver and a corresponding buffer. (See FIG. 2).

Once a data packet is received, the congestion controller in step 154 determines whether the congestion indicator bit of the data packet is or is not set. If the congestion indicator bit is not set, the congestion controller returns to step 152 to wait until another packet is transmitted. When the congestion indicator bit is not set, it indicates that congestion is not predicted to be imminent or is occurring in this particular node at this time. If there is no congestion, there is no need to manage the data packet traffic.

If the congestion indicator bit is set, it means that traffic congestion may be occurring or is going to occur in the node and possibly in the network. If the congestion indicator bit is set, the congestion controller increments the congestion counter in step 156. The congestion counter monitors the volume of data packets that are being received by a node. Each time a packet is received and the congestion indicator bit is set, the congestion counter is incremented. The congestion counter is used as an index into a table that has credit values indicating whether the destination node wants the source node to send more or less data packets.

Once the congestion counter is incremented in step 156, the congestion controller returns to step 152 and waits until another data packet is received. Method 150 continues indefinitely.

Figure 5:
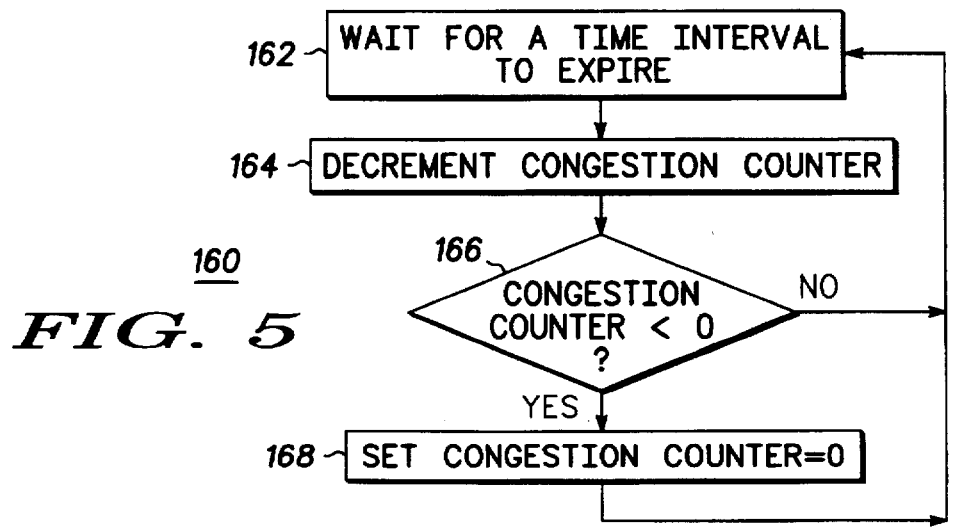
FIG. 5 shows a flowchart of a method for decrementing a congestion counter according to a preferred embodiment of the present invention.
Figures 6, 7:
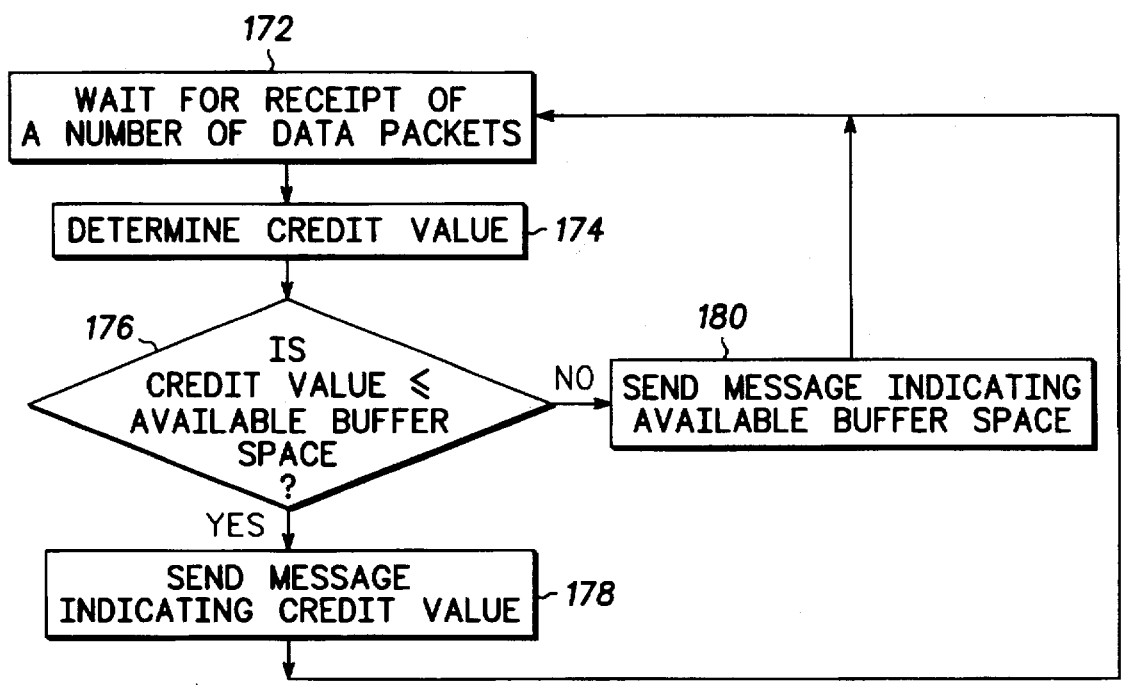
FIG. 6 shows a flowchart of a method for determining how many data packets can be sent by a source node to a destination node according to a preferred embodiment of the present invention.
FIG. 7 shows an example of a credit table.

FIG. 5 shows a flowchart of method 160 for decrementing a congestion counter according to a preferred embodiment of the present invention. When the congestion counter is decremented at predetermined time intervals, it indicates that data packet traffic through a particular node is becoming less congested. Method 160 is performed by the congestion controller (26 in FIG. 2) in each of the nodes of a network concurrently with the execution of method 100 (FIG. 3, supra), method 150 (FIG. 4, supra) and method 170 (FIG. 6, infra). Method 160 begins in step 162 by waiting for a predetermined time interval to expire. The predetermined time interval may be set to a specific number, such as one second for example, or may be changing, such as waiting one second during a first time interval, waiting two seconds during a second time interval and waiting five seconds during a third time interval.

Once the time interval expires in step 162, congestion controller decrements in step 164 the congestion counter. By decrementing the congestion counter, the congestion controller is acknowledging that more data packets can be sent from the source node to the destination node. After decrementing the congestion counter in step 164, congestion controller determines in step 166 whether the congestion counter is less than zero. If the congestion counter is not zero, method 160 returns to step 162 to wait for the next time interval to expire. If the congestion counter is less than zero, the congestion controller sets the congestion counter to zero in step 168 and returns to step 162. Method 160 continues indefinitely.

FIG. 6 shows a flowchart of method 170 for determining how many data packets can be sent by a source node to a destination node according to a preferred embodiment of the present invention. Method 170 is performed by the congestion controller (26 in FIG. 2) in each of the destination nodes of a network concurrently with the execution of method 100 (see FIG. 3, supra), method 150 (see FIG. 4, supra) and method 160 (FIG. 5, supra).

FIG. 2 shows one example of source and destination nodes. In FIG. 2, suppose subscriber unit 30 was the source node, while subscriber unit 31 was the destination node. Further suppose satellites 20 and 21 were intermediary nodes. Since subscriber unit 30 is a source node, this means that subscriber unit 30 is transmitting data packets to satellite 20, satellite 20 is transmitting the data packets to satellite 21, and satellite 21 is transmitting the data packets to subscriber unit 31, the destination node. Subscriber unit 31 is responsible for executing method 170 shown in FIG. 6 and telling subscriber unit 30 (e.g., the source node), how many data packets to send when network congestion is imminent or is going to occur.

In the preferred embodiment, method 170 begins in step 172 by waiting for receipt of a predetermined number of data packets. The predetermined number of data packets can be set to one, a number equivalent to the size of available space in the receive buffer, or some other number. The predetermined number of data packets could also be set to a credit value (explained below) or some variation thereof. In an alternative embodiment, step 172 may be replaced by an expiration of a time interval, similar to step 162 of FIG. 5. In another alternative embodiment, step 172 may be activated when the destination node transmits an acknowledgment back to the source node that indicates that the data packet or packets were received.

Once a predetermined number of data packets are received by the node in step 172, the congestion controller determines in step 174 a credit value. The credit value represents how many data packets the destination node is going to tell the source node to send so that the network or intermediary nodes do not become congested or less congested. The credit value is one of many values listed in a credit table that are determined from simulations of the network congestion or data packet load. The credit values indicate how many data packets should be sent when network and nodal traffic are at a predetermined data packet rate, as indicated by the congestion counter. The congestion counter is used as an index into the credit table.

FIG. 7 shows an example of credit table 200. Each congestion counter value in column 201 corresponds to a credit value in column 202. For example, when the congestion counter is "1", the credit value is determined to be "20" data packets. This may mean that the network is not congested, thus more data packets can be sent by the source node to the destination node. If the congestion counter is "7", the credit value is "1" data packet. This may mean that the network is congested, thus only one data packet can be sent by the source node to the destination node to avoid destruction of or lost data packets.

Once the credit value is determined in step 174, congestion controller determines whether the credit value is less than or equal to the available buffer space in the receive buffers. If the credit value is less than or equal to the available buffer space, congestion controller sends in step 178 a message to the source node (i.e., the node sending the data packets to the destination node), telling the source node to send a number of data packets equivalent to the credit value. Otherwise, if the credit value is greater than the available buffer space, congestion controller sends in step 180 a message to the source node indicating that the source node can send a number of data packets equivalent to the remaining, available buffer space.

As shown in FIG. 6, once congestion controller executes step 178 or 180, method 170 returns to step 172 to wait for receipt of a predetermined number of data packets, or the number of data packets as determined in step 178 or 180. Method 170 continues indefinitely.

It will be appreciated by those skilled in the art that the present invention includes a congestion controller and methods for monitoring data packet traffic flow, predicting when congestion is likely to occur and managing data packet traffic flow so that congestion does not occur. A congestion indicator bit is set before congestion is likely to occur so that traffic congestion can be avoided. Thus, it is an advantage of the present invention to monitor traffic flow and activate steps to avoid traffic congestion. It is another advantage of the present invention to predict when traffic congestion will occur and reduce traffic into the network to avoid traffic congestion. Yet another advantage of the present invention is to monitor traffic for congestion and to activate steps to reduce transmission of data packets through congested nodes of the network to reduce existing congestion. Another advantage of the present invention is to continue to provide an acceptable quality of service to mission critical traffic and existing voice and data traffic.

Accordingly, it is intended by the appended claims to cover all modifications of the invention which fall within the true spirit and scope of the invention. For example, a nodal network includes, but is not limited to, network 10 shown in FIG. 2. There are many other types of nodal networks, including a terrestrial cellular network or local area network, for example, for which the present invention is applicable.

What is claimed is:

1. A method for managing traffic congestion in a network, the network comprising a plurality of nodes including a source node, intermediary nodes and a destination node, the method comprising the steps of:
   a) predicting in each of the nodes whether congestion is imminent; and
   b) determining how many data packets the source node can send to the destination node when congestion is imminent by determining a credit value, determining whether the credit value is less than or equal to available buffer space in the destination node, sending a message to the source node indicating that the source node can send a number of data packets equivalent to the credit value if the credit value is less than or equal to the available buffer space in the destination node, and sending the message to the source node indicating that the source node can send the number of data packets equivalent to the available buffer space in the destination node when the credit value is greater than the available buffer space in the destination node.

2. A method as recited in claim 1, wherein step (a) includes the steps of:
   a1) monitoring current buffer usage at each of the nodes; and
   a2) each of the nodes determining whether congestion is imminent based on a comparison of a profile of the current buffer usage with a profile of buffer usage when congestion is imminent.

3. A method as recited in claim 1, wherein step (a) comprises the steps of:
   setting a congestion status in a node when congestion is imminent in the node; and
   clearing the congestion status in the node when congestion is not imminent in the node.

4. A method as recited in claim 3, further comprising the steps of:
   each of the nodes waiting until a data packet is received;
   each of the nodes determining whether its congestion status is set; and
   each of the nodes incrementing its own congestion counter when the congestion status is set.

5. A method as recited in claim 3, further comprising the step of setting a congestion indicator bit in a data packet that is to be transmitted from a first node to a second node when the congestion status is set in the first node.

6. A method as recited in claim 1, wherein step (a) further includes the steps of:
   setting a congestion status if congestion is occurring; and
   clearing the congestion status if congestion is not occurring.

7. A method as recited in claim 6, further comprising the steps of:
   each of the nodes waiting until a data packet is received;
   each of the nodes determining whether its congestion status is set; and
   each of the nodes incrementing its own congestion counter when the congestion status is set.

8. A method as recited in claim 6, further comprising the step of setting a congestion indicator bit in a data packet that is to be transmitted from a first node to a second node when the congestion status is set in the first node.

9. A method as recited in claim 1, wherein step (a) further includes the steps of:
   setting a congestion status in a node when congestion is imminent in the node;
   clearing the congestion status in the node when congestion is not imminent in the node;
   incrementing a congestion counter when the congestion status in the node is set and whenever a data packet is received; and
   decrementing the congestion counter every time a predetermined time interval expires.

10. A method as recited in claim 9, further comprising the steps of:
    determining, after the decrementing step, whether the congestion counter is less than zero; and
    setting the congestion counter to zero is the congestion counter is less than zero.

11. A method as recited in claim 1, wherein step (b1) further comprises the step of using a congestion counter as an index into a table to determine the credit value.

12. A method for managing traffic congestion in a network, the network comprising a plurality of nodes including a source node, intermediary nodes and a destination node, the method comprising the steps of:

a) predicting in each of the nodes whether congestion is imminent by monitoring current buffer usage at each of the nodes and determining whether congestion is imminent based on a comparison of a profile of the current buffer usage with a profile of buffer usage when congestion is imminent;

b) determining a credit value;

c) determining whether the credit value is less than or equal to available buffer space in the destination node;

d) sending a message to the source node indicating that the source node can send a number of data packets equivalent to the credit value if the credit value is less than or equal to the available buffer space in the destination node; and e) sending the message to the source node indicating that the source node can send the number of data packets equivalent to the available buffer space in the destination node when the credit value is greater than the available buffer space in the destination node.

13. A method for managing traffic congestion in a network, the network comprising a plurality of nodes including a source node, intermediary nodes and a destination node, the method comprising the steps of:

a) setting a congestion status in a node when congestion is imminent in the node;

b) incrementing a congestion counter when the congestion status in the node is set and whenever a data packet is received;

c) decrementing the congestion counter every time a predetermined time interval expires;

d) using the congestion counter as an index into a table to determine a credit value;

e) determining whether the credit value is less than or equal to available buffer space in the destination node;

f) sending a message to the source node indicating that the source node can send a number of data packets equivalent to the credit value if the credit value is less than or equal to the available buffer space in the destination node; and g) sending the message to the source node indicating that the source node can send the number of data packets equivalent to the available buffer space in the destination node when the credit value is greater than the available buffer space in the destination node.

14. A destination node comprising:

means for receiving data packets from a source node;

buffer coupled to the means capable of storing the data packets; and congestion controller coupled to the buffer capable of predicting when congestion is imminent by determining a credit value, determining whether the credit value is less than or equal to available buffer space in the destination node, sending a message to the source node indicating that the source node can send a number of data packets equivalent to the credit value if the credit value is less than or equal to the available buffer space in the destination node, and sending the message to the source node indicating that the source node can send the number of data packets equivalent to the available buffer space in the destination node when the credit value is greater than the available buffer space in the destination node.

* * * * *